US007120255B2

(12) United States Patent
Cross (10) Patent No.: US 7,120,255 B2
(45) Date of Patent: Oct. 10, 2006

(54) JAVA APPLICATIONS FOR SECURED PALM HELD CELLULAR COMMUNICATIONS

(75) Inventor: Gary J. Cross, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 10/116,567

(22) Filed: Apr. 4, 2002

(65) Prior Publication Data

US 2003/0191951 A1 Oct. 9, 2003

(51) Int. Cl.
*H04K 1/00* (2006.01)
*H04K 1/06* (2006.01)

(52) U.S. Cl. .................... 380/270; 380/42; 380/37; 380/275

(58) Field of Classification Search .......... 380/270, 380/247, 30, 255, 28, 275, 42, 37; 713/150, 713/153, 151, 189; 455/410, 465, 411; 705/50; 704/200, 500, 201, 270.1; 340/5.61, 5.64; 709/246, 247
See application file for complete search history.

(56) References Cited

U.S. PATENT DOCUMENTS

| 5,204,903 | A | | 4/1993 | Okada et al. ................. 380/46 |
|---|---|---|---|---|
| 5,996,022 | A | * | 11/1999 | Krueger et al. ............. 709/247 |
| 6,023,689 | A | * | 2/2000 | Herlin et al. ................. 705/67 |
| 6,026,360 | A | * | 2/2000 | Ono ............................. 704/260 |
| 6,072,402 | A | | 6/2000 | Kniffin et al. ........ 340/825.31 |
| 6,119,120 | A | * | 9/2000 | Miller ........................ 707/101 |
| 6,169,805 | B1 | | 1/2001 | Dunn et al. ................. 380/277 |
| 6,192,477 | B1 | | 2/2001 | Corthell ....................... 713/201 |
| 6,266,411 | B1 | * | 7/2001 | Etzel et al. .................... 380/28 |
| 6,424,935 | B1 | * | 7/2002 | Taylor ........................ 704/10 |
| 6,754,619 | B1 | * | 6/2004 | Nakatsuyama ............. 704/201 |
| 6,792,112 | B1 | * | 9/2004 | Campbell et al. ........... 380/270 |
| 6,990,198 | B1 | * | 1/2006 | Kim ............................ 380/37 |
| 2002/0143521 | A1 | * | 10/2002 | Call .............................. 704/1 |

* cited by examiner

Primary Examiner—Kim Vu
Assistant Examiner—Nirav Patel
(74) Attorney, Agent, or Firm—David A. Mims, Jr.; Rudolf O. Siegesmund

(57) ABSTRACT

The present invention is a data processing apparatus and method for encrypting, sending, receiving, and decrypting secure transmissions using a cellular telephone. The user may either purchase a cellular telephone which contains the encryption and decryption software, download the encryption and decryption software to an existing cellular telephone, or may purchase an encryption component which is adaptable to a conventional cellular telephone. Additionally, the described system of encryption and decryption can be used for secure communications in PDA/cellular telephones combinations and any other type of portable communications device.

The encryption process is a Java application which converts the user's audio signal into a wav file. The encryption program then creates a second wav file using the first wav file header. The encryption program then converts the data in the first wav file into encrypted data in the second wav file using public key encryption and a series of data manipulations. The encrypted second wav file is then transmitted to the intended recipient. Only recipients with the corresponding private key which matches the public key used to encrypt the data will be able to decrypt the transmitted data.

In the decryption process, the user receives a wav file transmitted from the sender. The decryption program then decrypts the encrypted wav file using public key encryption and a series of data manipulations. The decryption program then converts the encrypted data in the first wav file into decrypted data in the second wav file using public key encryption and a series of data manipulations. The decrypted second wav file is then emitted over a speaker to the intended recipient.

4 Claims, 9 Drawing Sheets

JAVA APPLICATIONS FOR SECURED PALM HELD CELLULAR COMMUNICATIONS

CROSS-REFERENCE TO RELATED APPLICATION

The present invention is related to the subject matter of co-pending U.S. patent application Ser. No. 10/042,505 entitled "Secured Radio Communications System, Method, and Computer Program Product," filed on Jan. 9, 2002.

FIELD OF THE INVENTION

The present invention relates generally to the field of cellular telephone communications, and more specifically to a data processing system, method, and apparatus for transmitting secure cellular telephone communications.

BACKGROUND OF THE INVENTION

Cellular telephones are well known in the art. A cellular telephone is defined as a handheld computer, embedded controller, or embedded controller that includes a system unit having a central processing unit (CPU) and associated volatile and non-volatile memory. The cellular telephone may also include random access memory (RAM), basic input/output system read only memory (BIOS ROM), an attached LCD display touch screen, a pointing device to enter text (stylus), serial ports, parallel ports, infrared ports, a wireless modem, analog-to-digital converters (ADC), digital-to-analog converters (DAC), or CODEC devices for connecting to the public telephone switched network. One of the distinguishing characteristics about cellular telephones is that the components are sufficiently small and modular to allow them to fit on a system board that fits into the user's hand and is powered by batteries.

Cellular telephones can receive input from either an internal microphone or an external microphone connected to the cellular telephone through a microphone port in the cellular telephone. Likewise, the signal received by a cellular telephone can be emitted by either an internal speaker or an external speaker connected to the cellular telephone through a speaker port in the cellular telephone. Cellular telephones transmit and receive information using radio signals and are capable of sending and receiving radio signals in either an analog or digital format. Unfortunately, the signal emitted form the cellular telephone is not encrypted and can be monitored using radio scanners. Furthermore, even if an encrypted signal is sent to a cellular telephone, existing technology does not provide the means for the cellular telephone to decrypt the signal.

Encryption algorithms which ensure that only the intended recipient of an electronic message will access the message are well known. One such method is the asymmetric or public key algorithm described in U.S. Pat. No. 6,169,805 entitled "System and Method of Operation for Providing User's Security on Demand Over Insecure Networks." The public key algorithm is a method for encrypting electronic messages sent from a first entity to a second entity using a pair of mathematical keys. The algorithm comprises a public key and a private key which are mathematically related such that if the private key is used to encrypt data, then only the matched public key can be used to decrypt the data, and vice-versa. Encryption keys may be obtained form a certificate authority, which is a mutually trusted third party who issues digital certificates. The certificate authority matches the public and private keys to an identity, e-mail address, or similar information provided by the two original parties.

Secured telephone communications are essential to many organizations, particularly the military. Presently however, the preferred method of sending and receiving encrypted data over a cellular telephone is to purchase a telephone which is specifically designed for encrypted communication. Alternatively, separate equipment may be purchased and utilized with conventional cellular telephones in order to transmit and receive encrypted telephone communications. Therefore, a need exists for an apparatus, method, and system to allow a user to encrypt, transmit, receive, and decrypt data on conventional cellular telephone.

SUMMARY OF THE INVENTON

The present invention, which meets the needs above, is a data processing apparatus and method for encrypting, sending, receiving, and decrypting secure transmissions using a cellular telephone. The user may either purchase a cellular telephone which contains the encryption and decryption software, download the encryption and decryption software to an existing cellular telephone, or may purchase an encryption component which is adaptable to a conventional cellular telephone. Additionally, the described system of encryption and decryption can be used for secure communications in PDA/cellular telephones combinations and any other type of portable communications device.

The encryption process is a Java application which converts the user's audio signal into a wav file. The encryption program then creates a second wav file using the first wav file header. The encryption program then converts the data in the first wav file into encrypted data in the second wav file using public key encryption and a series of data manipulations. The encrypted second wav file is then transmitted to the intended recipient. Only recipients with the corresponding private key which matches the public key used to encrypt the data will be able to decrypt the transmitted data.

In the decryption process, the user receives a wav file transmitted from the sender. The decryption program then decrypts the encrypted wav file using public key encryption and a series of data manipulations. The decryption program then converts the encrypted data in the first wav file into decrypted data in the second wav file using public key encryption and a series of data manipulations. The decrypted second wav file is then emitted over a speaker to the intended recipient.

DETAILED DESCRIPTION OF THE PREFERRED EMBODIMENT

The term "Java application" as used herein means any program written in the object-oriented programming language developed by Sun Microsystems. The term "wav file" as used herein means an audio file format developed by the Microsoft Corporation in which audio waveforms are stored as integers. The term "wav file header" as used herein means an information structure in a wav file that precedes and identifies the information that follows in the remainder of the wav file. The wav file header includes the sampling rate for the wav file. The term "sampling rate" as used herein means the frequency with which samples of an analog audio signal are taken when the analog audio signal is transformed into the digital wav format. The term "total number of samples" as used herein means the total number of integers that represent the raw audio sector data within the wav file. The term "loop invariant" means a condition that allows a program loop to reiterate and determines when the loop ends. The term "public key encryption" as used herein means an asymmetric scheme that uses a pair of keys for encryption where the public key encrypts the data, and a unique corresponding private key decrypts the data. The process may be reversed where the sender uses the private key to encrypt data and only the people who have the corresponding public key are able to decrypt the data. The term "private key" as used herein means one of the two keys in public key encryption. The user keeps the private key secret and uses it to encrypt data to be sent by the user and to decrypt data received by the user. The term "public key" as used herein means the other one of the two keys in public key encryption. The user releases the public key to the authorized recipients of the encrypted data, who can use it for encrypting data to be sent to the user and for decrypting data sent by the user. The term "telephony" as used herein means a telephone technology-voice, fax, or modem transmissions based on either the conversion of sound into electrical signals or wireless communication via radio waves. The term "native" as used herein means of, pertaining to, or characteristic of something that is in its original form. For example, many applications are able to work with files in a number of formats; the format the application uses internally is its native file format. Files in other formats must be converted to the application's native format before they can be processed by the application. The term "WAP" as used herein is an acronym for Wireless Application Protocol and means a standard for providing Internet access and other data-based services, such as e-mail, electronic transactions, news, and weather reports, over wireless networks. The WAP is designed to provide such services to digital mobile telephones and other wireless terminals. Just as the TCP/IP standards make it possible for many different kinds of computer equipment to communicate through the Internet, the WAP specification is intended to work across different types of wireless network. The term "WTAI" as used herein is an acronym for Wireless Telephony Applications Interface and is a collection of features compiled into function libraries which provides the means to create telephony applications. Typically, WTAI is used to set-up a mobile originated call.

Figure 1:
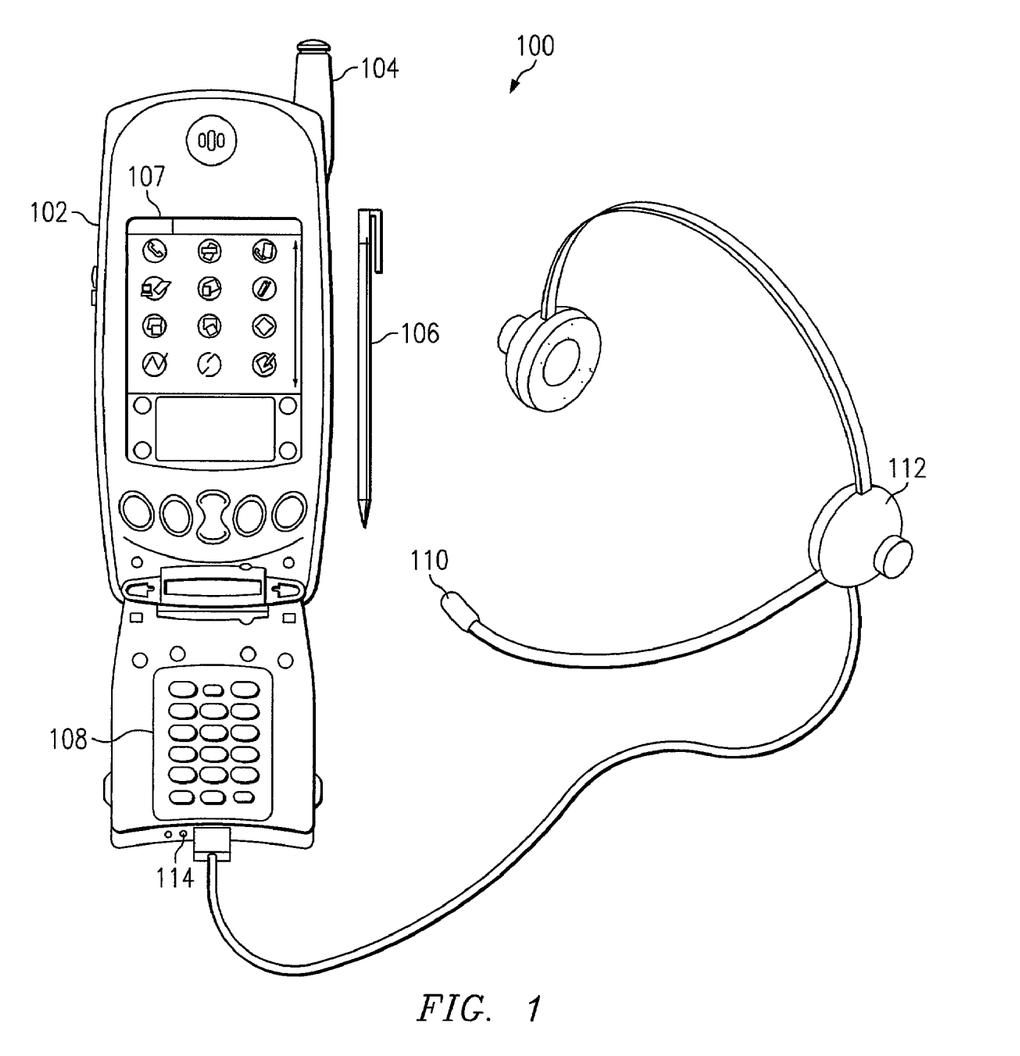
FIG. 1 is a pictorial representation of a cellular telephone.

FIG. 1 is a pictorial representation of a cellular telephone 100. Cellular telephone 100 contains housing 102, antenna 104, stylus 106, LCD screen 107, keypad 108, microphone 110, speaker 112, and input/output (I/O) ports 114. Antenna 104 transmits and receives data for cellular telephone 100. Keypad 108 is used for data entry and LCD screen 107 is used for data display. Optionally, stylus 106 is used to input data onto LCD screen 107. I/O ports 114 are used for direct wire connection of microphone 110 and speaker 112. Microphone 110 is used to input voice signals into cellular telephone 100. Speaker 112 is used to communicate voice signals received by cellular telephone 100 to the user.

Figure 2:
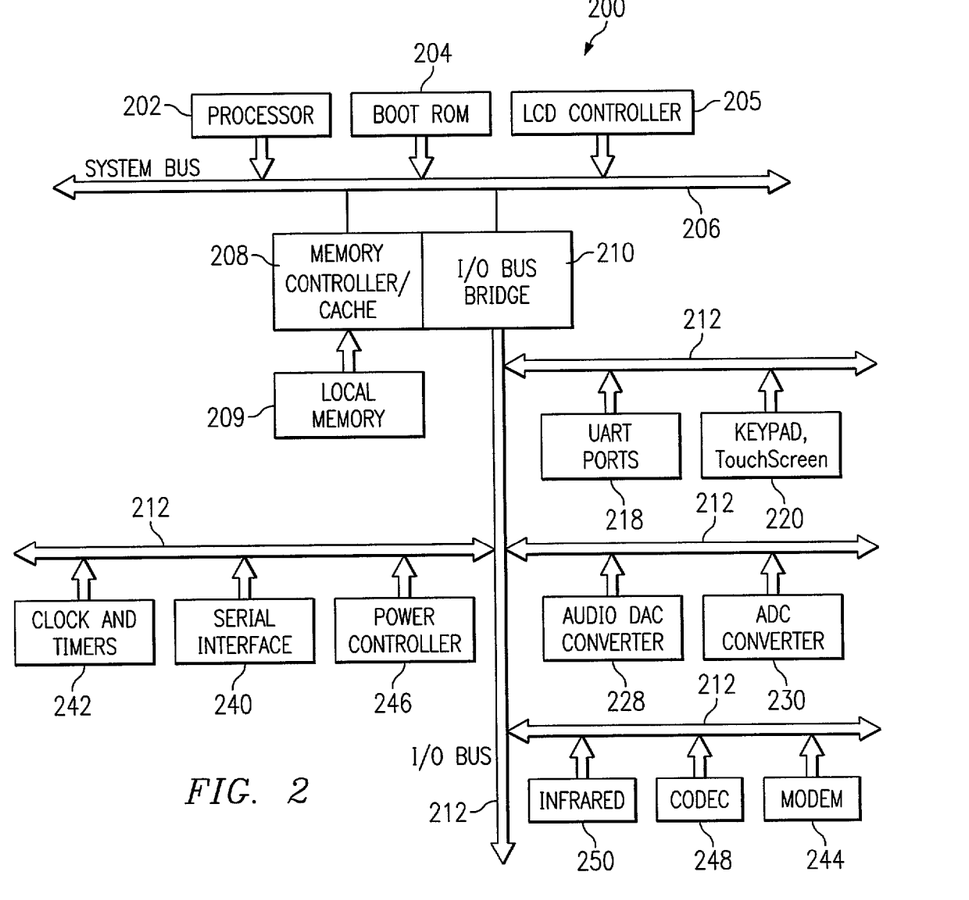
FIG. 2 is a diagram of the data processing system contained within the cellular telephone of FIG. 1.

FIG. 2 is a depiction of the data processing system 200 contained within housing 102 of cellular telephone 100. Data processing system 200 comprises processor 202, boot ram 204, and LCD controller 205 coupled to system bus 206. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral components are connected via I/O bus 212. Typical peripheral components include Universal Asynchronous Receiver Transmitter (UART) 218, a keypad or touch screen 220, digital-to-analog converters 228, analog-to-digital converters 230, serial interface controller 240, clocks and timers 242, modem 244, power controller 246, CODEC ports 248 for communicating with the Public Telephone Switch, and infrared ports 250. Those skilled in the art will appreciate the depiction of data processing system 200 in FIG. 2 is exemplary and is not intended as an architectural limitation of the present invention. Data processing system 200 may be a separate, embedded controller, such as model number EP7309 from the CIRRUS Corporation.

Figure 3:
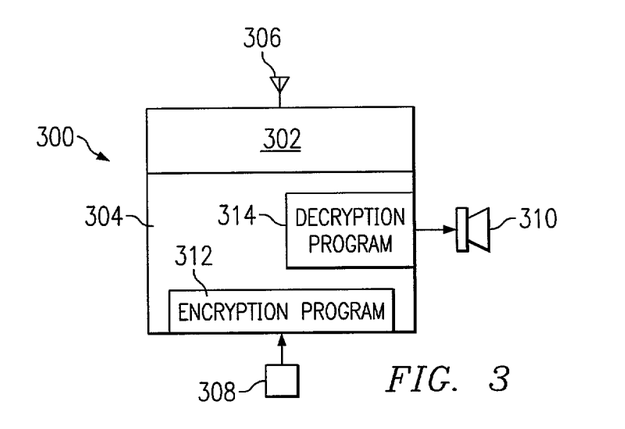
FIG. 3 is a diagram of a cellular telephone interacting with software and external devices.

FIG. 3 is a depiction of cellular telephone 300 interacting with software and external devices. Cellular telephone 300 comprises modem 302 with antenna 306 and computer system 304. Modem 302 is a transmitter/receiver which interacts with a wireless network through antenna 306. Computer system 304 is a computer system similar to data processing system 200. Those skilled in the art will be aware of how best to configure modem 302 and computer system 304.

Encryption program 312 is a software program (similar to encryption program 400) which runs on computer system 304. Encryption program 312 monitors microphone 308 (similar to microphone 110) and encrypts the voice data received from microphone 308. The encrypted voice data is transmitted from cellular telephone 310 by modem 302 and travels over a wireless network to the intended recipient. Likewise, decryption program 314 is a software program (similar to decryption program 500) which runs on computer system 304. Decryption program 314 monitors modem 302 for reception of encrypted transmissions. Encrypted transmissions are received from a wireless network via modem 302. Decryption program 314 then decrypts the voice data in the encrypted transmission and emits the audio signal contained therein on speaker 310 (similar to speaker 112).

Figure 4A:
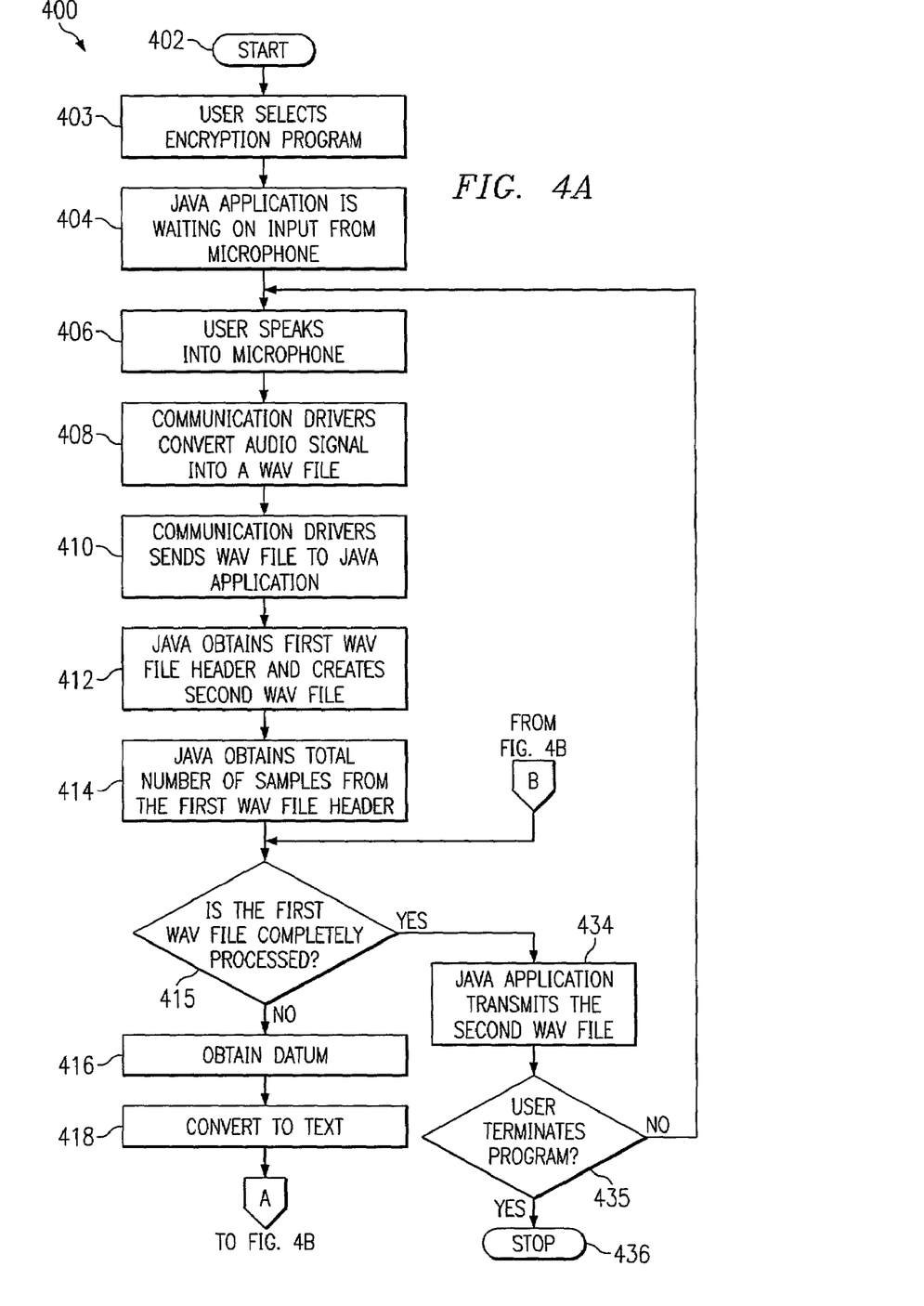
FIGS. 4A and 4B are a flow chart of the encryption program receiving an audio signal, encrypting the signal, and transmitting the encrypted signal.
Figure 4B:
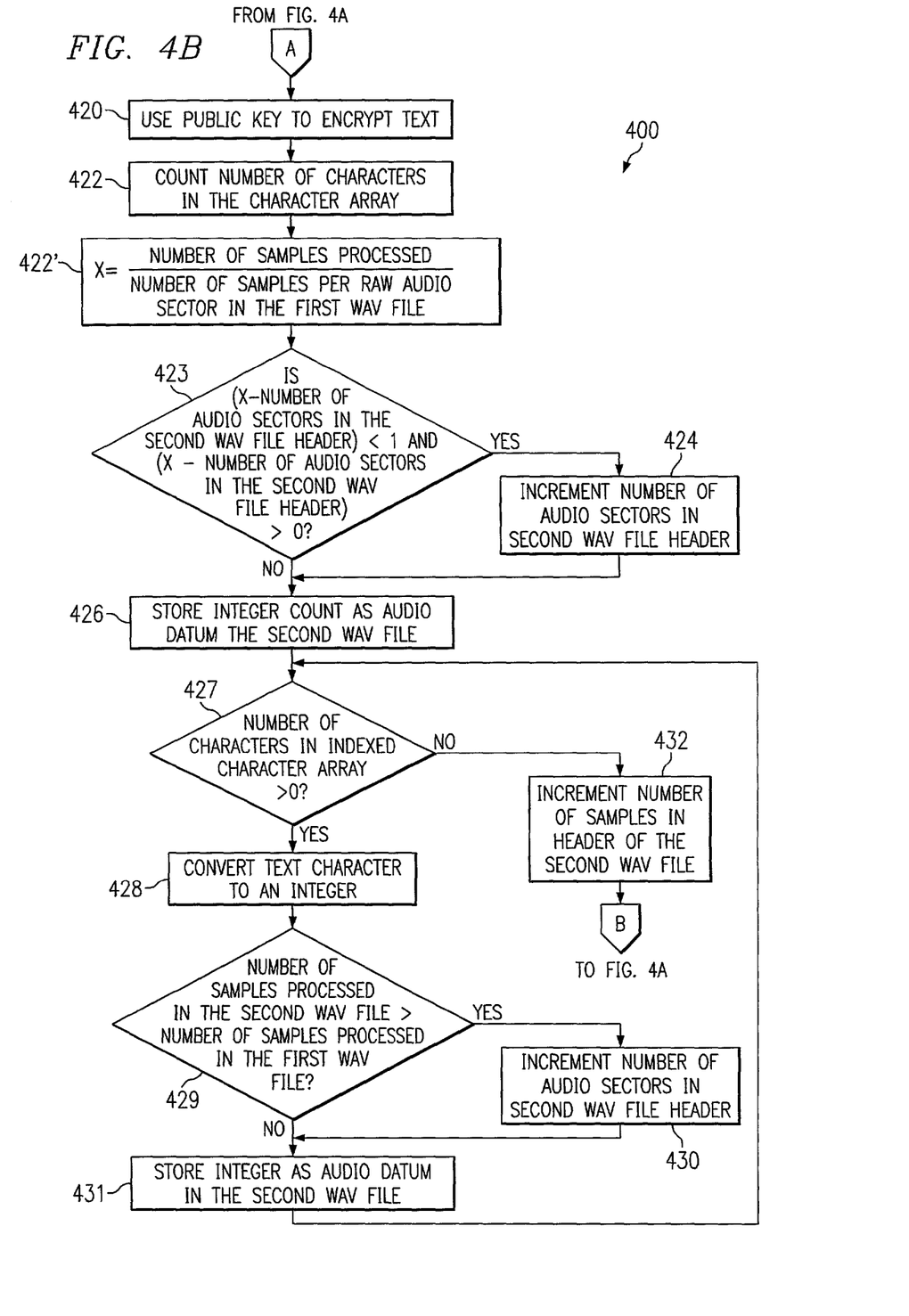

FIG. 4 is a flow chart of encryption program 400. Encryption program starts (402) and the user selects an icon on the LCD Screen to initiate a secured call and enters their public key (403). The cellular telephone then awaits audio signal input via the microphone (404). When the user speaks into the microphone (406), the communications drivers convert the audio signal into a first wav file (408). The communications driver then sends the first wav file to a Java application (410). The Java application obtains the first wav file, extracts the first wav file header, and creates a second wav file (412). The Java application then obtains the total number of samples from the first wav file header (414). The total number of samples is equal to the number of raw audio sectors in the first wav file multiplied by the number of samples per raw audio sectors in the first wav file.

Encryption program 400 then enters the primary loop (consisting of steps 415–432) where the loop invariant is controlled by the total number of samples. Encryption program 400 determines if all audio data in the first wav file has been processed by decrementing the value of the sampling rate of the first wav file (415). When the total number of samples reaches zero, all audio data in the first wav file has been processed, and encryption program 400 proceeds to step 434. If the total number of samples is greater than zero, encryption program 400 proceeds to step 416 where the first datum (defined here as audio datum) is read from the first wav file (416). The audio datum, which for a wav file will always be an integer, is converted into text (418). The text is then encrypted using the public key, which creates a character array (420). Encryption program 400 counts the number of text characters in the character array and obtains an integer count (422). Encryption program 400 then computes a state variable, x, where x is equal to the number of samples processed divided by the number of samples per raw audio sector in the first wav file. (422'). Encryption program 400 then determines if the the value determined by subtracting the number of audio sectors in the second wav file header from x is less than 1 and greater than 0. (423). If so, then the number of audio sectors in the second wav file header is incremented (424), and encryption program 400 proceeds to step 426. If not, then encryption program 400 bypasses step 424 and proceeds directly to step 426. The integer count from step 422 is then stored as an audio datum in the audio sector of the second wav file (426).

Encryption program 400 then enters a secondary loop (steps 427–431) wherein the text string created in step 420 is indexed and if the number of characters in the resulting array is greater than zero, encryption program 400 proceeds to step 428 (427). If the number of characters in the array at step 427 is equal to zero, then encryption program 400 proceeds to step 432. At step 428, the text characters in the indexed character array are converted to an integer (428). A determination is then made whether the number of samples processed in the second wav file is greater than the number of samples processed in the first wav file (429). If so, then the number of audio sectors in the second wav file header is incremented (430), and encryption program 400 proceeds to step 431. If at step 429 the number of samples processed in the second wav file is not greater than the number of samples processed in the first wav file, then encryption program 400 bypasses step 430 and proceeds to step 431. The integer obtained in step 428 is then stored as an audio datum in the second wav file (431). The secondary loop reiterates until the character array created in step 420 has been completely indexed (427). The number if samples in the second wav file header is then incremented (432) and encryption program 400 returns to step 415. The primary loop ends when all audio data in the first wav file has been processed. At that point, encryption program 400 transmits the second wav file to the intended recipient (434). Encryption program 400 continues back to step 406 until the user terminates the program by selecting the appropriate icon on the LCD screen (435), at which point encryption program 400 ends (436).

Figure 5A:
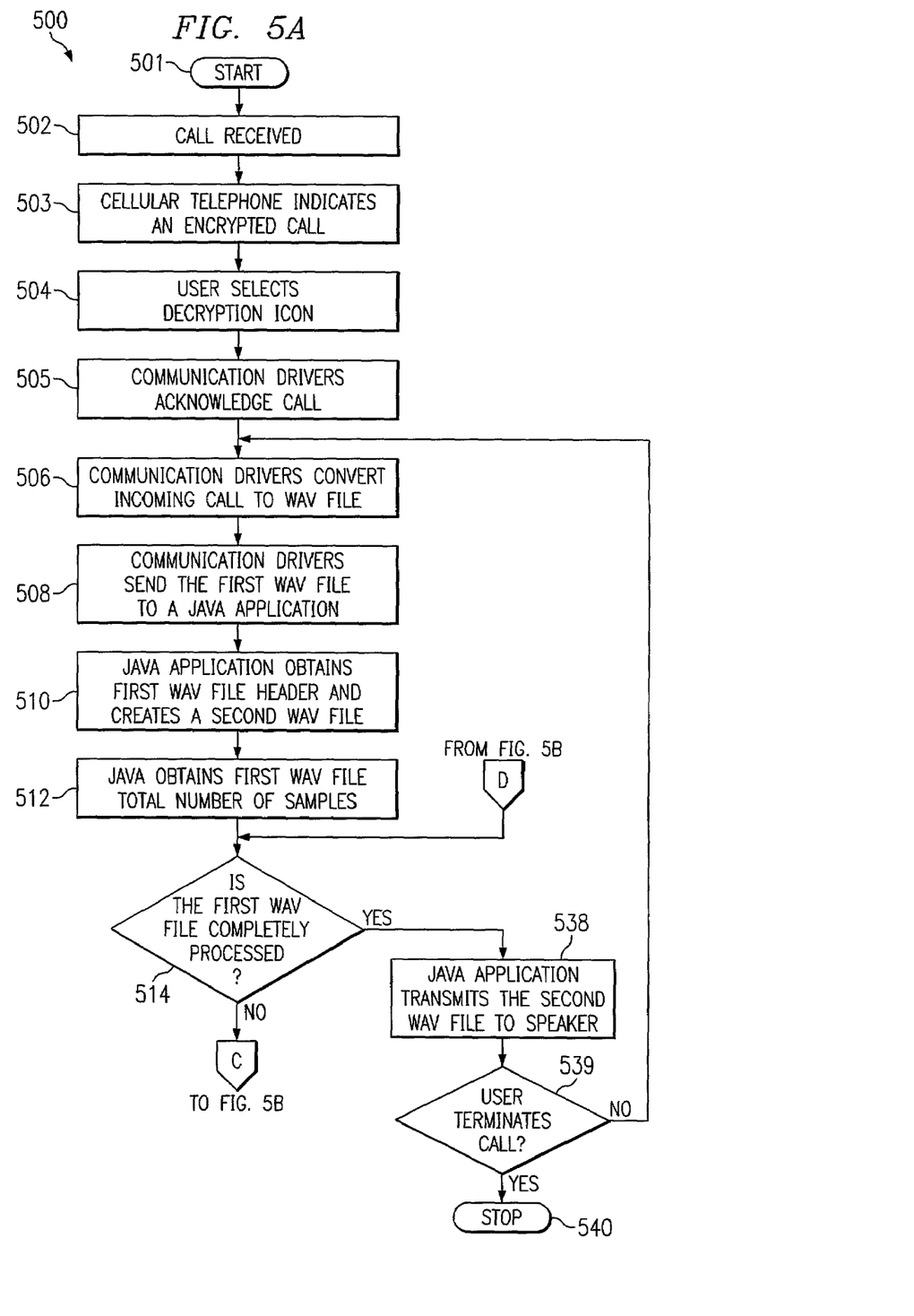
FIGS. 5A and 5B are a flow chart of the decryption program receiving an encrypted signal, decrypting the signal, and emitting an audio signal.
Figure 5B:
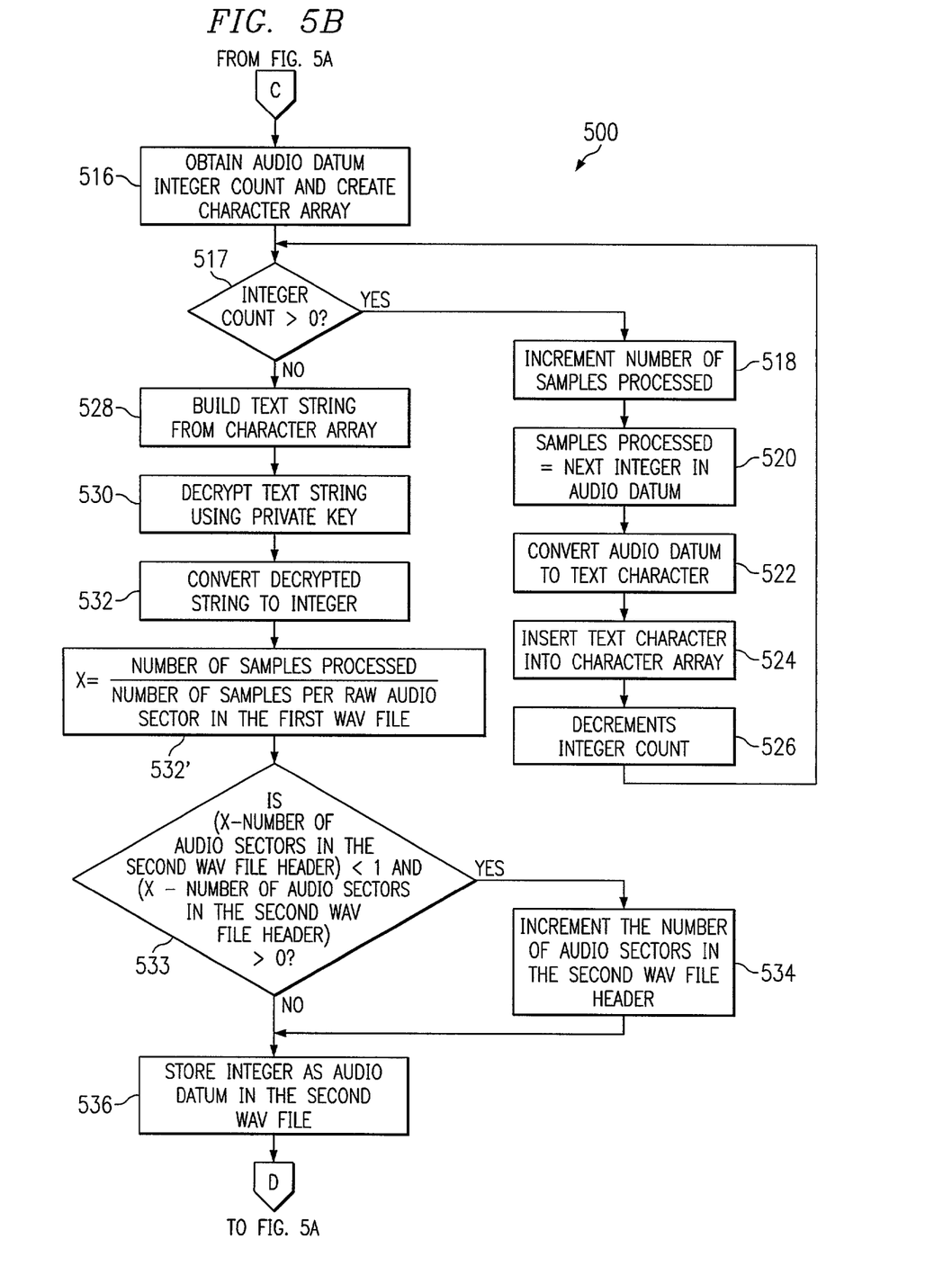

FIG. 5 is a flow chart of decryption program 500. Decryption program 500 starts (501) and an encrypted call is received on the cellular telephone (502). The cellular telephone then indicates that an encrypted call is being received by displaying a decryption program icon on the LCD screen and optionally emitting a unique audible tone which also signifies reception of an encrypted incoming call (503). The user then selects the decryption program icon from the LCD screen to launch the Java application that will decrypt the encrypted call and the user then enters the private key corresponding to the private key used to encrypt the encrypted data (504). The communication drivers on the cellular telephone then acknowledge the incoming call (505). The communication driver then converts the incoming call into a first wav file (506). The communication driver then sends the first wav file to a Java application, which obtains the first wav file header and uses it to create a second wav file (510). Decryption program 500 then obtains the total number of samples from the first wav file header (512). The total number of samples is equal to the number of raw audio sectors in the first wav file multiplied by the number of samples per raw audio sector in the first wav file.

Decryption program 500 then enters a primary loop (steps 514–536) where the total number of samples obtained from step 512 is used as the loop invariant. Decryption program 500 then makes a determination of whether the the first wav file is completely processed (514). If the number of processed samples is not greater than the number of samples in the first wav file, then decryption program 500 proceeds to step 516. If the number of processed samples is greater than the number of samples in the first wav file, then encryption program proceeds to step 538. After determining that the number of processed samples is less than the number of samples in the first wav file, decryption program 500 uses the audio datum obtained in step 512 as an integer count to create a character array that will store the encrypted string of the first wav file created in step 420 (516).

A secondary loop (steps 517–526) is then entered to control the process of storing encrypted text. Decryption program 500 makes a determination if the integer count, initially obtained in step 516, is greater than zero (517). If the integer count is greater than zero, then decryption program 500 proceeds to step 518. If the integer count in 517 is not greater than zero, then decryption program 500 proceeds to step 528. After determining that the integer count from 516 is greater than zero in step 517, decryption program 500 increments by one the number of samples processed (518). Using the number of samples processed as an index, the next integer is obtained from the audio datum (520). Here, decryption program 500 uses the sum of the number of samples processed as the index to the next integer with the audio datum. Decryption program 500 then converts the audio datum to text characters (522) and then converts the text characters into a character array (524). Decryption program 500 then decrements the integer count processed (526) and proceeds back to step 517. Once the character array has been filled, the secondary loop terminates and decryption program 500 proceeds to step 528 where a text string is created from the character array (528). Decryption program 500 then decrypts the text string using the private encryption key (530) and converts the encrypted text into an integer (532). Decryption program 500 then computes a state variable, x, where x is equal to the number of samples processed divided by the number of samples per raw audio sector in the first wav file (532'). Decryption program 500 then makes a determination if the value determined by subtracting the number of audio sectors in the second wav file header from x is less than 1 and greater than 0 (533). If the number of samples in the second wav file is greater, then decryption program 500 stores the audio datum in the second wav file and the number of sectors in the second wav file header is incremented (534) and proceeds to step 536. If the number of samples in the second wav file is not greater, then decryption program 500 bypasses step 534 and proceeds immediately to step 536. In step 536, decryption program 500 stores the integer as audio datum in the second wav file (536) and proceeds back to step 514. The primary loop is repeated until all of the audio data in all of the audio sectors of the first wav file has been processed. Decryption program 500 then transmits the second wav file to the speaker where it is emitted as an audible signal to the user (538). Decryption program 500 continues back to step 506 until the user terminates the program by selecting the appropriate icon on the LCD Screen (539), at which point encryption program 500 ends (540).

Figure 6:
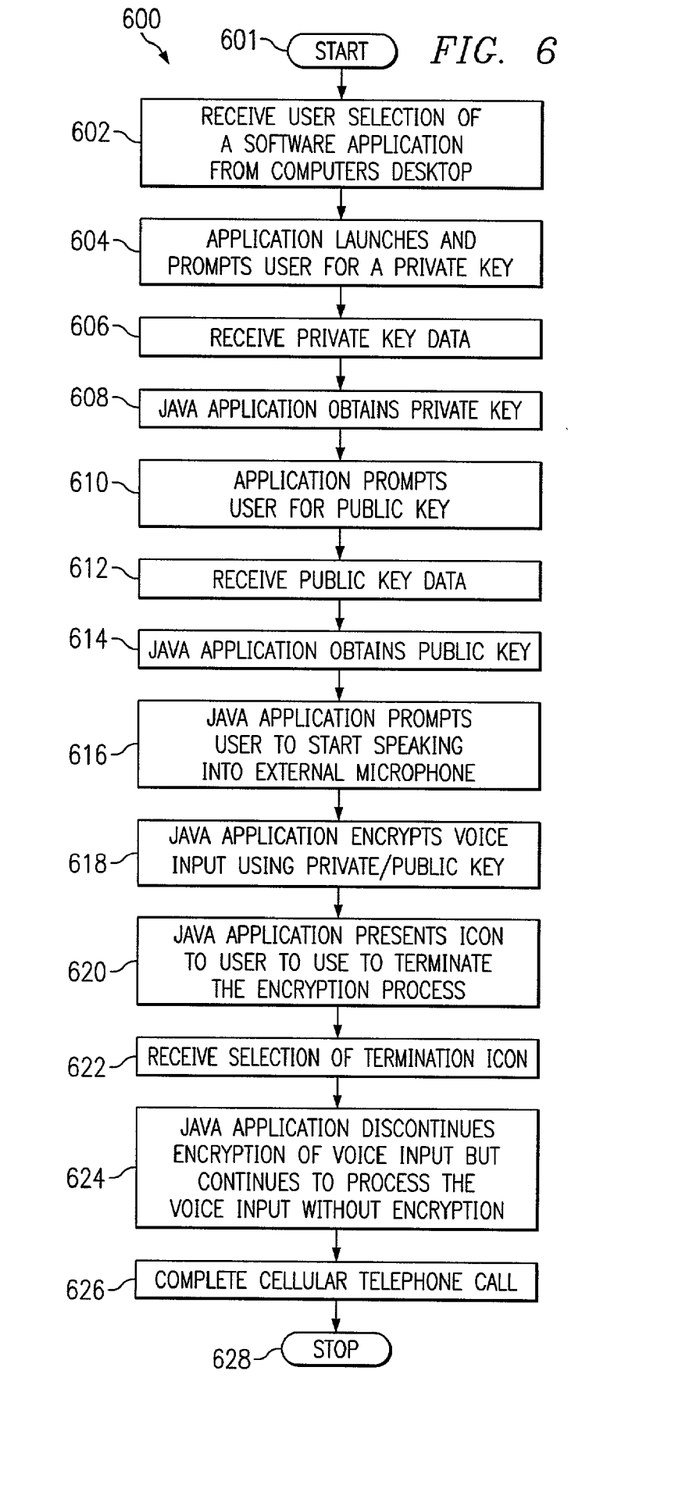
FIG. 6 is a flow chart illustrating the selection and de-selection of secured transmissions.

FIG. 6 is a flow chart illustrating the process of sending and receiving an encrypted communication using a cellular telephone. Anytime a cellular telephone call is initiated, communications process 600 starts (601) and an encryption icon appears on the cellular telephone LCD screen. The user selects this icon to initiate an encrypted communication (602). Selection of the icon in step 602 launches encryption program 300, which prompts the user to enter a private key (604). The user enters the private key (606) and the private key is acquired by the encryption program (608). The encryption program then prompts the user to enter a public key (610). The user enters a public key (612), which is obtained by the encryption program (614). When the encryption program is prepared to begin encrypting the voice data, the encryption program prompts the user to start speaking (616). As the user speaks, the encryption program converts the user's voice signal into a wav file and encrypts the wav file using the public and private keys (618). The encryption program then presents the user with an icon which will allow the user to terminate the process (620). When the user selects the icon (622), encryption program 400 stops encrypting the audio data (624). The telephone call is allowed to continue and ends at the user's discretion (626). The process then stops (628).

Figure 7:
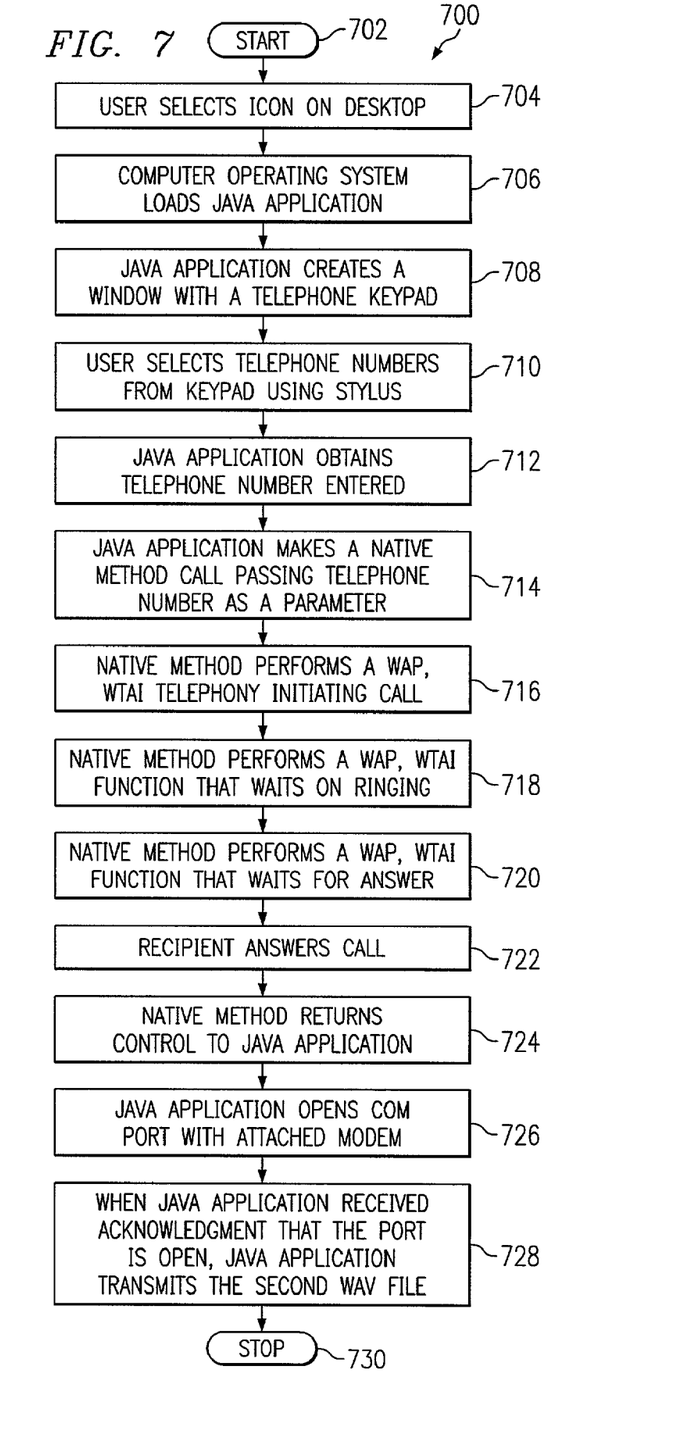
FIG. 7 is a flow chart illustrating the process of a cellular telephone initiating a communication process with another telephone.

FIG. 7 is a flow chart illustrating the process of a cellular telephone initiating a secured telephone call. Before this process initiates, the user has to download the appropriate encryption software and public and private keys form an external source. External sources can include a certificate authority or any other source available over the internet. The required data can be downloaded via the modem, infrared ports, or I/O ports or purchase the program as a separate module of the cellular telephone. Communications program 700 starts (702) and the user selects an icon to launch the telephone application from the LCD screen (704). Communications program 700 then loads the Java application associated with encryption program 300 (706). Communications program 700 then creates a window on the cellular screen which resembles a typical telephone keypad (708). The user then selects the appropriate telephone number using the stylus or other input device (710). Communications program obtains the telephone number entered by the user (712) and makes a native method call using the telephone number as a parameter (714). The native method performs a WAP WTAI telephony initiating the call (716). The native method performs a WAP WTAI function that waits on the ringing (718). The native method then performs a WAP WTAI function that waits for an answer (720). Then the recipient answers the call (722) and the native method then returns control to the Java application (724). The Java application then opens the corn port with the attached modem (726). When the Java application receives acknowledgement that the port is open, the Java application transmits the second wav file (728) and the program ends (730).

Figure 8:
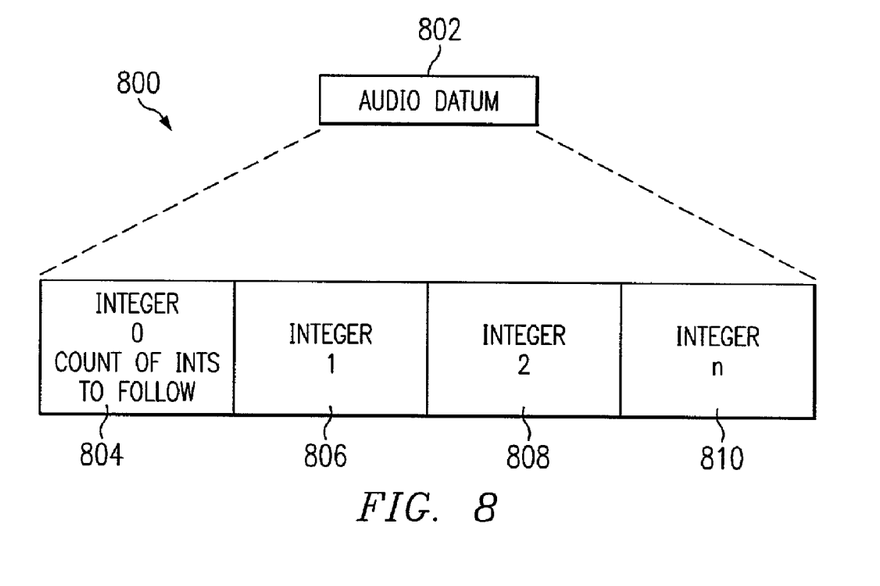
FIG. 8 is a pictorial representation of the datum found in audio sector of a wav file and the encrypted data in the datum.

FIG. 8 is a pictorial representation of datum 800 found in the audio sector of the second wav file and the encrypted data 804, 806, 808, and 810 in datum 800. For every audio datum in the first wav file, audio datum 802 is encrypted and the encrypted text is converted to integers. Integer count 804 processed from the encrypted text is the first audio datum and converted integers 806, 808, and 810 are stored after integer count 804.

Figure 9:
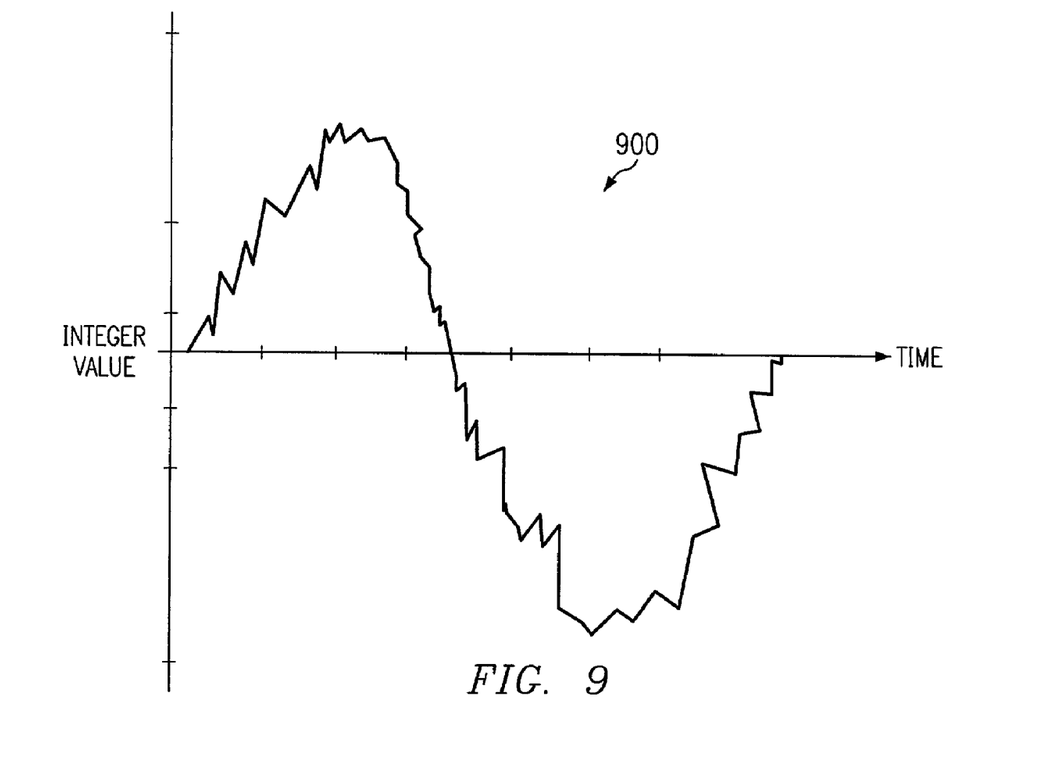
FIG. 9 is a graphical representation of a voice signal.

FIG. 9 is a graphical representation of voice signal 900. This voice signal is intercepted by the communication driver of the microphone port. The y-axis of the graph represents the value of the integer stored in the wav file and the x-axis represents time. The audio datum is an integer that can be found along the curve represented by the voice signal in this illustration. The signal in FIG. 9 represents a 16 bit sampling rate; however the sampling rate is best determined by those skilled in the art.

While the described invention discloses the use of the encryption and decryption process for a cellular telephone, it is not meant to limit in any way the general concept of the invention. For example, the described process could be utilized on any type of communications devices including PDA/cellular telephone combinations, pagers, convention telephones, fax machines, and portable email devices. Additionally, the present invention can be utilized over a wired network, the internet, or a satellite network. While a wav file is described here, the present invention also includes any type of electronic file used to capture data. Additionally, the present invention could be used to transfer non-audio data from one user to another.

Additionally, the described invention can be utilized in a separate apparatus which may interact with a pre-existing cellular telephone, PDA/cellular telephone combinations, or similar communications device through the I/O ports, USB ports, infrared ports, or serial ports of the communications device. In this case, a preferred usage of the invention is to attach an external microphone and speaker to the invention, and attach the invention to the conventional cellular telephone. As the user speaks into the telephone, the invention encrypts the audio signal using the described encryption program and transmits the encrypted signals through the cellular telephone. Likewise, the present invention can be utilized to decrypt encrypted messages by receiving them on a cellular telephone, decrypting the encrypted message in the invention using the described decryption process and emitting the resulting audio signal over an external microphone.

It will be understood from the foregoing that various modifications and changes may be made in the preferred embodiment of the present invention by those skilled in the art without departing from its true spirit. It is intended that this description is for purposes of illustration only and should not be construed in a limiting sense. The scope of the invention should be limited only by the language of the following claims.

What is claimed is:

1. A method of transmitting encrypted data over a cellular telephone comprising:

using the cellular telephone, the cellular telephone containing an encryption program, and having a receiver and an encryption icon, responsive to a selection of the encryption icon by a user, the encryption program performs the steps of:

converting a received audio signal into a wav file;
converting the wav file to text;
encrypting the text;
converting the encrypted text to an integer;
storing the integer in a second wav file; and
transmitting the second wav file to a recipient.

2. A method of receiving encrypted data over a cellular telephone comprising:
using the cellular telephone, the cellular telephone containing a decryption program and having a speaker, responsive to receiving an encrypted audio datum in a first wav file, the decryption program performs the steps of:
converting the encrypted audio datum into a text character;
inserting the text character into a character array;
building a text string from the character array;
decrypting the text string;
converting the decrypted text string to an integer;
storing the integer as an audio datum on a second wav file; and
transmitting the second wav file to the speaker.

3. A computer program product stored in a local memory of a cellular phone, the cellular phone having a receiver and a speaker, the computer program product containing a plurality of instructions to cause the cellular phone to encrypt a received audio signal, the plurality of instructions comprising:
responsive to selection of an encryption icon on the cellular telephone, converting the received audio signal into a wav file;
converting the wav file to a text;
encrypting the text into an encrypted text;
converting the encrypted text to an integer;
storing the integer in a second wav file; and
transmitting the second wav file to a recipient.

4. A computer program product stored in a local memory of a cellular phone, the cellular phone having a receiver and a speaker, the computer program product containing a plurality of instructions to cause the cellular phone to decrypt a received encrypted audio datum in a wav file, the plurality of instruction comprising:
responsive to receiving the encrypted audio datum in the wav file,
converting the encrypted audio datum into a text character;
inserting the text character into a character array;
building a text string from the character array;
decrypting the text string into a decrypted text string;
converting the decrypted text string to an integer;
storing the integer as an audio datum on a second wav file; and
transmitting the second wav file to the speaker so that the second wave file is emitted over the speaker to an intended recipient.

* * * * *

UNITED STATES PATENT AND TRADEMARK OFFICE
CERTIFICATE OF CORRECTION

PATENT NO.         : 7,120,255 B2
APPLICATION NO. : 10/116567
DATED              : October 10, 2006
INVENTOR(S)        : Cross It is certified that error appears in the above-identified patent and that said Letters Patent is hereby corrected as shown below:

Col. 8, line 2: "corn" should be -- com--

Signed and Sealed this

Fifth Day of December, 2006

JON W. DUDAS
*Director of the United States Patent and Trademark Office*